(12) United States Patent
Kuribayashi et al.

(10) Patent No.: US 11,433,583 B2
(45) Date of Patent: Sep. 6, 2022

(54) METHOD OF MANUFACTURING RESIN PIPE

(71) Applicant: THE YOKOHAMA RUBBER CO., LTD., Tokyo (JP)

(72) Inventors: Nobuaki Kuribayashi, Hiratsuka (JP); Susumu Hatanaka, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 17/599,667

(22) PCT Filed: Dec. 5, 2019

(86) PCT No.: PCT/JP2019/047542
§ 371 (c)(1),
(2) Date: Sep. 29, 2021

(87) PCT Pub. No.: WO2020/208863
PCT Pub. Date: Oct. 15, 2021

(65) Prior Publication Data
US 2022/0097267 A1     Mar. 31, 2022

(30) Foreign Application Priority Data
Apr. 11, 2019    (JP) .............................. JP2019-075323

(51) Int. Cl.
*B29C 45/16*     (2006.01)
*B29C 45/33*     (2006.01)
(Continued)

(52) U.S. Cl.
CPC .............. *B29C 45/16* (2013.01); *B29C 45/33* (2013.01); *B29C 45/57* (2013.01);
(Continued)

(58) Field of Classification Search
CPC ..... B29C 45/1459; B29C 45/37; B29C 45/16; B29C 45/33; B29C 45/57;
(Continued)

(56) References Cited

U.S. PATENT DOCUMENTS 5,948,343 A    9/1999   Hiroki et al.
6,182,707 B1 *   2/2001   Shiraki ............ F02M 35/10347
                                          138/109
(Continued)

FOREIGN PATENT DOCUMENTS

EP        0 757 936 A1    2/1997
JP        H09-123212 A   5/1997
(Continued)

*Primary Examiner* — Alison L Hindenlang
*Assistant Examiner* — Debjani Roy
(74) *Attorney, Agent, or Firm* — Carrier Blackman & Associates, P.C.; Joseph P. Carrier; Anne G. Sabourin

(57) ABSTRACT

Two molded articles having a cylindrical two-piece split shape is formed by forming two primary cavities in a desired shape with molds assembled together and injecting a molten primary resin into the two primary cavities. An assist material is injected into a secondary cavity into which a molten secondary resin is injected in a state where the two molded articles are located opposed to each other via a space therebetween and internally fitted into one secondary cavity formed by the molds that are assembled together by shifting the positions. A flange portion having any desired shape is disposed on an outer circumferential surface of a resin pipe in a two-layer structure in which an inner surface layer formed of the cured secondary resin is integrated with an outer surface layer formed of the two molded articles. Thus, a portion having any desired shape is easily manufactured on the resin pipe.

12 Claims, 11 Drawing Sheets

(51) Int. Cl.
*B29C 45/57* (2006.01)
*B29L 9/00* (2006.01)
*B29L 23/00* (2006.01)

(52) U.S. Cl.
CPC ... *B29C 2045/1692* (2013.01); *B29L 2009/00* (2013.01); *B29L 2023/004* (2013.01)

(58) Field of Classification Search
CPC ........ B29C 2045/1692; B29K 2705/00; B20L 2023/22; B29L 2009/00; B29L 2023/004
See application file for complete search history.

(56) References Cited

U.S. PATENT DOCUMENTS

| | | | |
|---|---|---|---|
| 2005/0255267 A1* | 11/2005 | Nishida | B29C 66/543 425/406 |
| 2016/0214329 A1* | 7/2016 | Fernandes | B29C 70/446 |
| 2017/0197345 A1* | 7/2017 | Okamoto | B29C 45/372 |
| 2018/0045352 A1 | 2/2018 | Moore et al. | |
| 2018/0119848 A1 | 5/2018 | Nishino et al. | |

FOREIGN PATENT DOCUMENTS

| | | | |
|---|---|---|---|
| JP | 2003-181868 A | | 7/2003 |
| JP | 2009-148970 A | | 7/2009 |
| JP | 2018-202704 A | | 12/2018 |
| JP | 2018202704 | * | 12/2018 |
| WO | 96/26062 A1 | | 8/1996 |

* cited by examiner

METHOD OF MANUFACTURING RESIN PIPE

TECHNICAL FIELD

The present invention relates to a method of manufacturing a resin pipe and particularly relates to a method of manufacturing a resin pipe in which a portion having any desired shape can be more simply manufactured on an outer circumferential surface of a resin pipe in a two-layer structure by resin injection molding such as a gas assist molding method using an assist material.

BACKGROUND ART

A gas assist molding method in which in the event of molding a resin pipe by resin injection molding, molten resin is injected into a mold and then high-pressure gas such as nitrogen gas is injected into the mold is known (for example, see Patent Document 1). Instead of high-pressure gas, water, a metal ball, or a resin ball may be injected as an assist material into the mold at high pressure.

In addition, a method of manufacturing a resin pipe in a two-layer structure including an inner layer and an outer layer by resin injection molding using a floating core (an assist material) is proposed (see Patent Document 2). In the proposed method, after resins that form the inner layer and the outer layer are each filled into a main cavity, the floating core is passed through the resin that forms the inner layer. In this way, a predetermined amount of the resin that forms the inner layer is extruded from the main cavity by the floating core, and a resin pipe in a two-layer structure is formed.

For example, various portions such as flange portions for fixing the resin pipe in a predetermined place may be formed on an outer circumferential surface of the resin pipe. However, in the molding method proposed in Patent Document 2, another member needs to be integrated with the outer circumferential surface of the molded resin pipe, and thus the manufacturing process may be complicated. Accordingly, there is room for improvement in more simply manufacturing a portion having any desired shape on the outer circumferential surface of the resin pipe in a two-layer structure.

CITATION LIST

Patent Literature

Patent Document 1: JP 2003-181868 A
Patent Document 2: JP H09-123212 A

SUMMARY OF INVENTION

Technical Problem

An object of the present invention is to provide a method of manufacturing a resin pipe in which a portion having any desired shape can be more simply manufactured on an outer circumferential surface of a resin pipe in a two-layer structure by resin injection molding such as a gas assist molding method using an assist material.

Solution to Problem

In order to achieve the object described above, a method of manufacturing a resin pipe according to embodiments of the present invention is a method of manufacturing a resin pipe using a die slide injection mold configured such that positions at which molds to be assembled together during primary molding and secondary molding are slid, in which the resin pipe is manufactured by: forming two molded articles in a cylindrical two-piece split shape by injecting a primary resin that is molten into two primary cavities that are formed by the molds assembled together during the primary molding; internally fitting the two molded articles in a cylindrical shape into one secondary cavity formed by the molds assembled together during the secondary molding such that the molded articles are located opposed to each other via a space between the molded articles, injecting a secondary resin that is molten into the secondary cavity, and then injecting an assist material into the secondary cavity; and integrating an inner surface layer formed of the secondary resin, that has cured, with the two molded articles.

Advantageous Effects of Invention

According to embodiments of the present invention, by forming the mold in advance such that the primary cavity has a desired shape, a molded article having a desired outer shape can be molded during the primary molding. Then, by integrating an inner surface layer formed of the secondary resin cured during the secondary molding with the two molded articles, a portion having any desired shape can be more simply manufactured on an outer circumferential surface of the resin pipe in a two-layer structure that is formed of the inner surface layer formed of the secondary resin and an outer surface layer formed of the primary resin.

BRIEF DESCRIPTION OF DRAWINGS

FIG. 1(A) is a longitudinal cross-sectional view and FIG. 1(B) is a transverse cross-sectional view.

DESCRIPTION OF EMBODIMENTS

Figure 1:
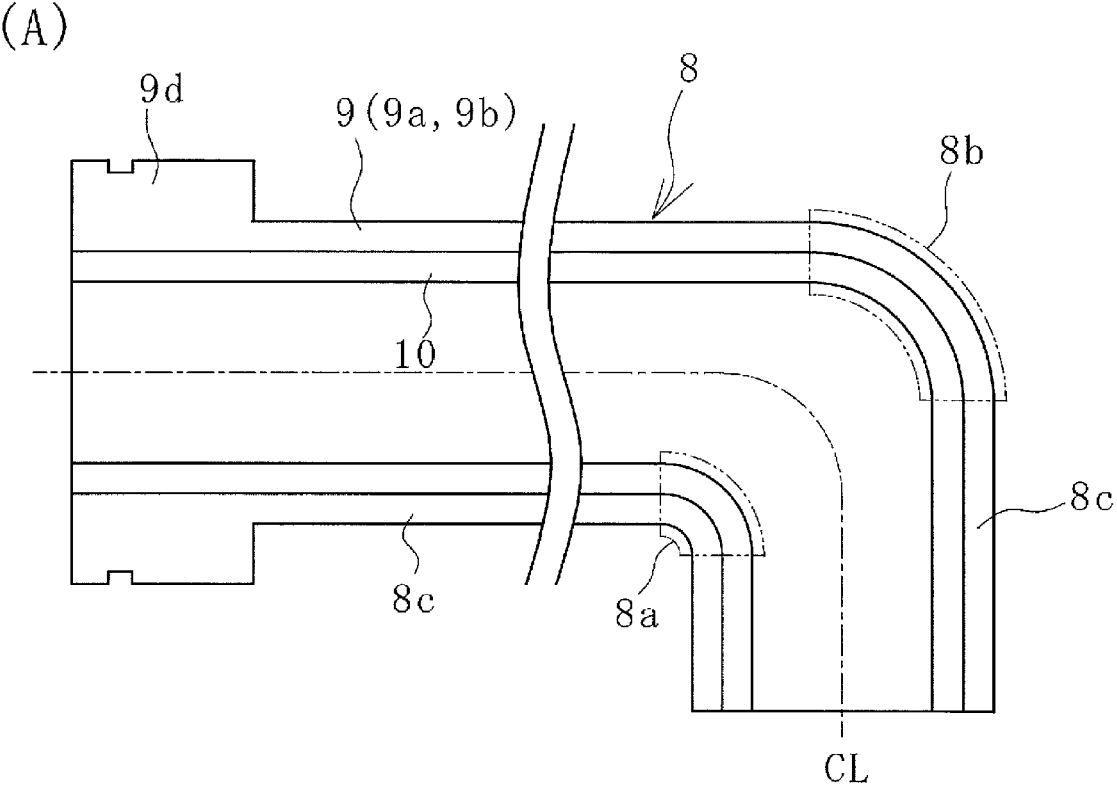
FIG. 1 illustrates a resin pipe manufactured according to an embodiment of the present invention, where
Figure 1:
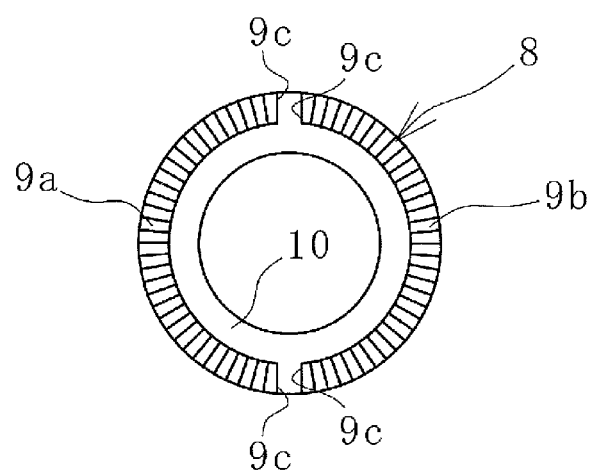

A method of manufacturing a resin pipe according to an embodiment of the present invention will be described based on embodiments illustrated in the drawings.

As illustrated in FIG. 1, a resin pipe 8 manufactured according to an embodiment of the present invention is configured in a two-layer structure where an outer surface layer 9 and an inner surface layer 10 are integrally bonded together. Specifically, the outer surface layer 9 made of resin is bonded to an outer circumferential surface of the inner surface layer 10 made of resin and having a cylindrical shape. The outer surface layer 9 is formed of two molded articles 9a, 9b, and includes a flange portion 9d integrally formed on an outer circumferential surface of the outer surface layer 9. The inner surface layer 10 is interposed between opposed end portions 9c in a circumferential direction of the respective molded articles 9a, 9b. A dot-dash line CL in the drawing indicates a center line passing through the cross-sectional center in a pipe passage.

The resin pipe 8 of this embodiment is a bent pipe including straight pipe portions (straight-line regions 8c) and bent portions (a bent inner region 8a and a bent outer region 8b). Wall surfaces of the bent inner region 8a and the bent outer region 8b are illustrated surrounded by two-dot chain lines. The resin pipe 8 may include only the straight-line region 8c, and the resin pipe 8 may include only the bent regions 8a, 8b. In addition, the outer circumferential surface of the outer surface layer 9 includes the flange portion 9d, but not limited thereto, may include a portion having any desired shape.

Figure 2:
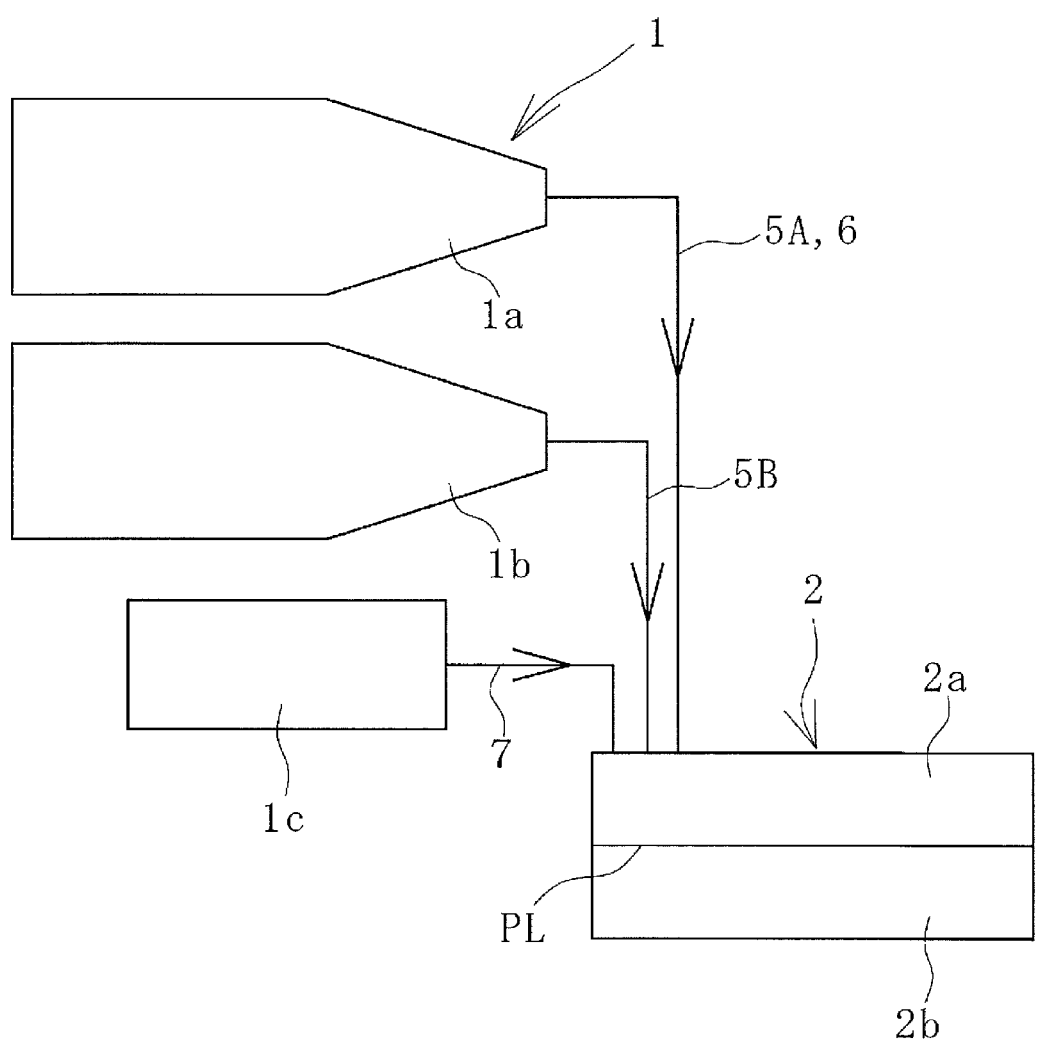
FIG. 2 is an explanatory diagram illustrating a forming device configured to manufacture a resin pipe.

The resin pipe 8 is manufactured with a forming device 1 illustrated in FIG. 2. The forming device 1 includes a cylinder 1a configured to inject a molten primary resin 5A into a mold 2 (2a, 2b), and a cylinder 1b configured to inject a molten secondary resin 5B into the mold 2 (2a, 2b), and an assist material injection unit 1c configured to inject an assist material 7 into the mold 2 (2a, 2b). In the forming device 1, primary molding by die slide injection and secondary molding using an assist material are performed.

Appropriate types of resins are selected as the primary resin 5A and the secondary resin 5B depending on the performance or the like required for the resin pipe 8. The primary resin 5A and the secondary resin 5B can be the identical resin or different resins. In this embodiment, of the molten primary resin 5A and the molten secondary resin 5B, reinforcing fibers 6 such as glass fibers or carbon fibers are mixed only in the primary resin 5A.

A material excellent in durability against fluid flowing through the pipe passage is adopted as the secondary resin 5B. Preferably, the primary resin 5A has rigidity (breaking stress) higher than that of the secondary resin 5B. For example, the primary resin 5A is made of a material having rigidity (breaking stress) higher than that of the secondary resin 5B, or the reinforcing fibers 6 are mixed in the primary resin as in this embodiment.

The assist material 7 may be a known material. An appropriate material is selected from gas such as nitrogen gas, liquid such as water, and a solid such as a metal ball, a resin ball, or a bullet-shaped metal block or resin block. A known appropriate mechanism is adopted to the assist material injection unit 1c depending on the type of the assist material 7.

The mold 2 is a so-called two-piece split type. The mold 2 includes one mold 2a and the other mold 2b to be assembled together. The molds 2a, 2b are bonded and separated via a parting line PL as a boundary. The mold 2 is a die slide injection mold configured such that the positions at which the molds to be assembled together during primary molding and secondary molding are slid.

Figure 3:
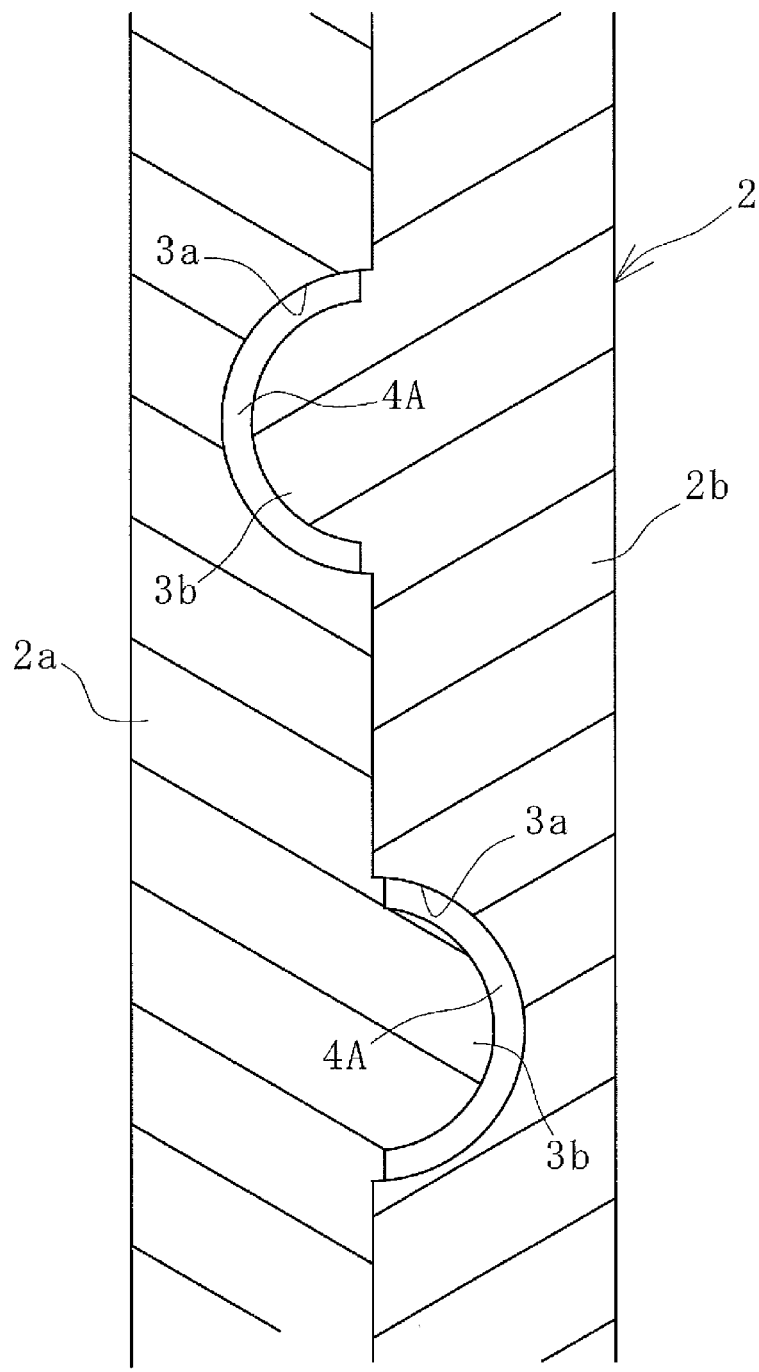
FIG. 3 is an explanatory diagram illustrating, in a cross-sectional view, a state where molds of FIG. 2 are assembled together to form primary cavities.

As illustrated in FIG. 3, a recess portion 3a and a protrusion portion 3b are formed on mutually opposed surfaces of the molds 2a, 2b. Primary cavities 4A and a secondary cavity 4B that are described below are formed by assembling the molds 2a, 2b with each other. A runner connecting via a gate to the primary cavities 4A, the secondary cavity 4B is formed in the mold 2. This runner is connected to an injection nozzle of the forming device 1. A discharge portion for the secondary resin 5B or the assist material 7 injected into the secondary cavity 4B is also provided in the mold 2.

Next, an example of the procedures of a method of manufacturing a resin pipe according to embodiments of the present invention will be described.

During the primary molding illustrated in FIG. 3, the recess portion 3a and the protrusion portion 3b of the respective molds 2a, 2b are disposed opposed to each other, and the molds 2a, 2b are assembled together. The two primary cavities 4A, 4A are formed by the assembled molds 2a, 2b. In this embodiment, the primary cavities 4A, 4A are formed in the identical shape, but can be formed in a different shape.

Figure 4:
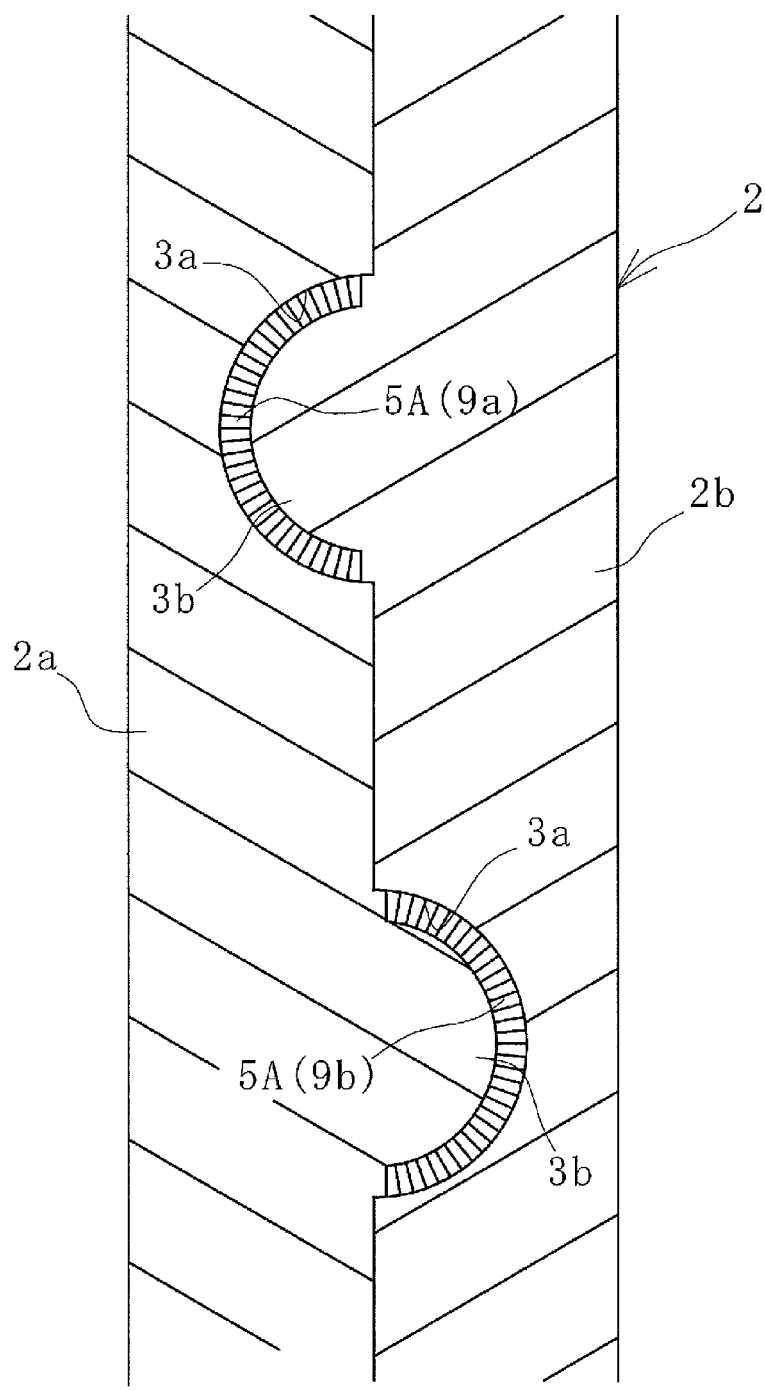
FIG. 4 is an explanatory diagram illustrating a state where a primary resin is injected into the primary cavities of FIG. 3.

Next, as illustrated in FIG. 4, the molten primary resin 5A in which the reinforcing fibers 6 are mixed is injected from the cylinder 1a into the mold 2. The injected primary resin 5A is injected into the primary cavities 4A through a sprue, the runner, and the gate that are formed in the mold 2. The injected primary resin 5A is cured, and thus the two molded articles 9a, 9b in a cylindrical two-piece split shape (a shape in which a cylindrical body is divided into two portions along the cylinder axial direction) are formed. The molded articles 9a, 9b become the outer surface layer 9 of the resin pipe 8.

The flange portion 9d is integrally formed on the outer circumferential surface of the molded articles 9a, 9b by the primary molding. In the primary molding, since resin molding is performed by die slide injection, a portion having any desired shape can be formed at any desired position on the outer circumferential surface of the molded articles 9a, 9b.

Figure 5:
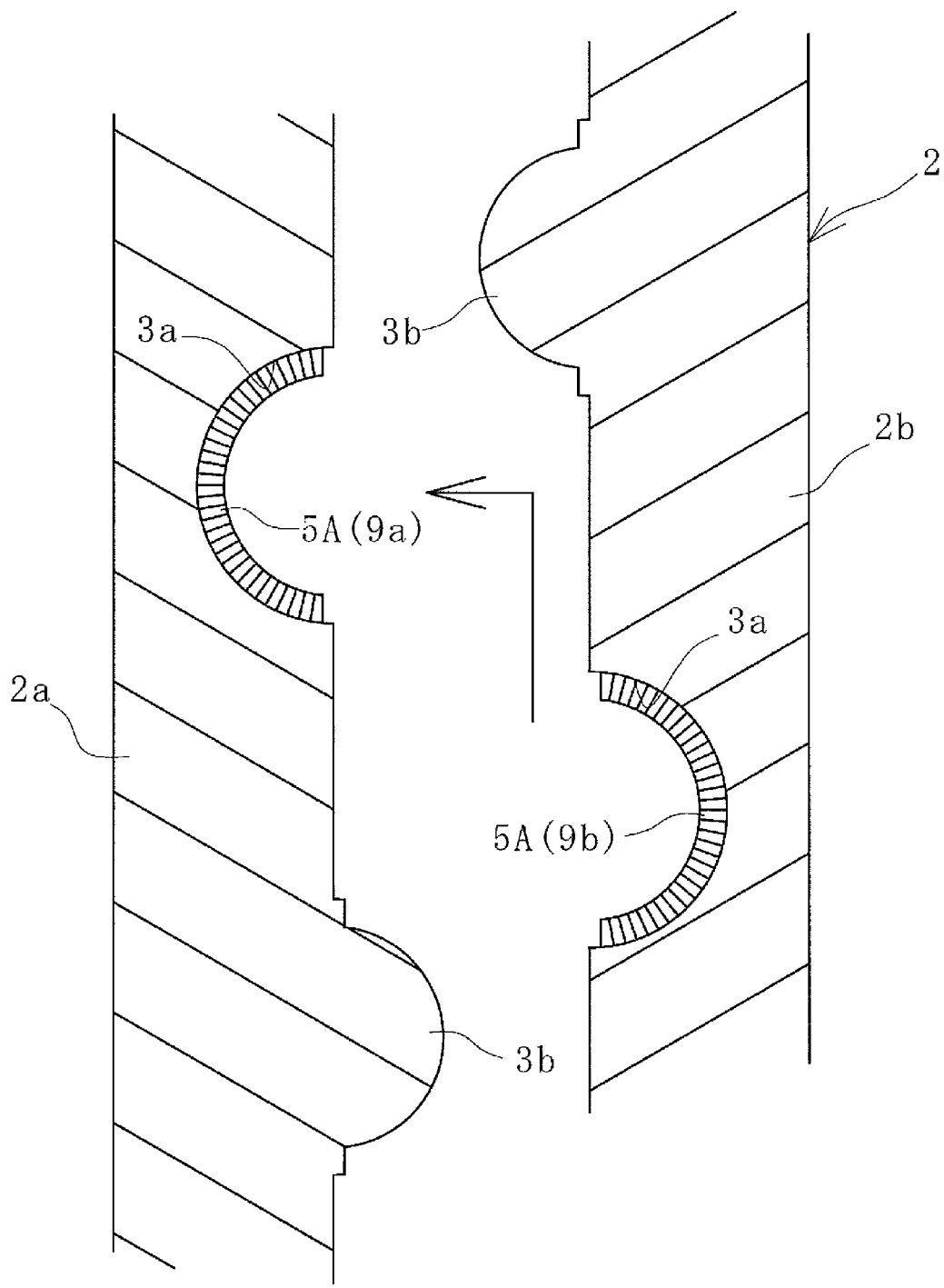
FIG. 5 is an explanatory diagram illustrating, in a cross-sectional view, a process in which the positions of the molds of FIG. 4 are shifted to be assembled together.

Next, as illustrated in FIG. 5, after the mold 2 is opened, one mold 2b is slid to a predetermined position so that the recess portions 3a of the respective molds 2a, 2b are disposed opposed to each other. The molded articles 9a, 9b are held in the recess portions 3a of the respective molds 2a, 2b.

Figure 6:
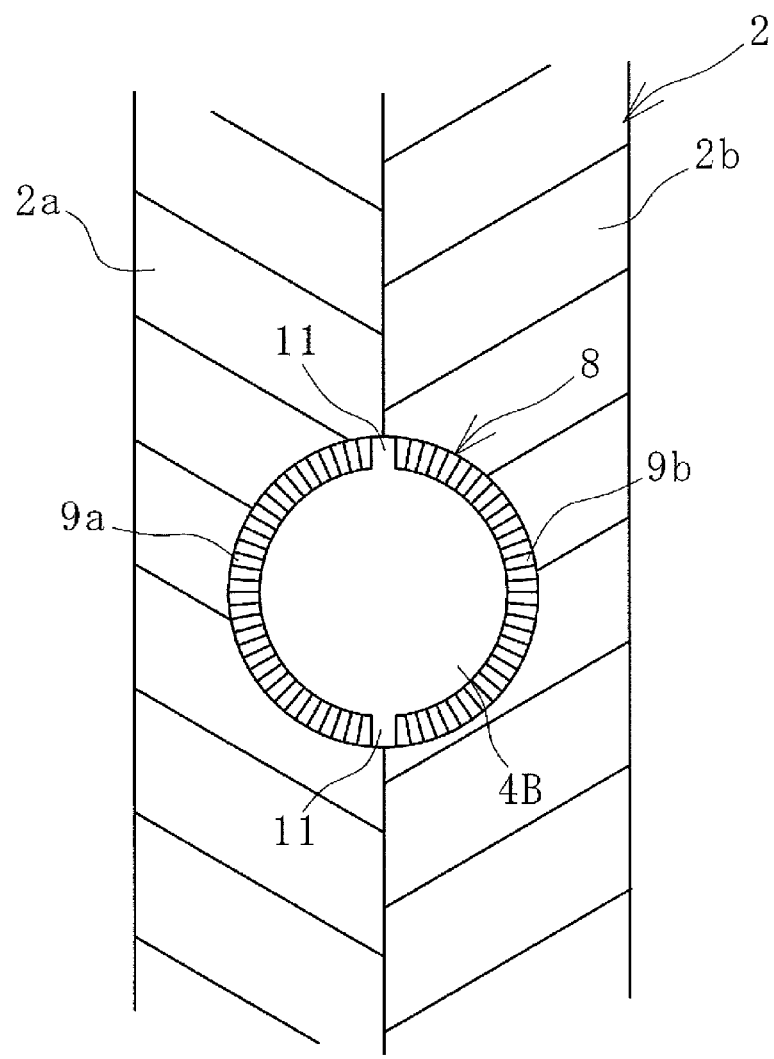
FIG. 6 is an explanatory diagram illustrating, in a cross-sectional view, a state where the molds of FIG. 5 are assembled together and thus a secondary cavity is formed.

Next, the secondary molding is performed. During the secondary molding, as illustrated in FIG. 6, the molds 2a, 2b are assembled together in the predetermined position to which one mold 2b is slid. One secondary cavity 4B is formed by the molds 2a, 2b assembled together. In the secondary cavity 4B, the two molded articles 9a, 9b are internally fitted in a cylindrical shape. Additionally, the opposed end portions 9c of the respective molded articles 9a, 9b in the circumferential direction are located opposed via a space 11 therebetween.

Figure 7:
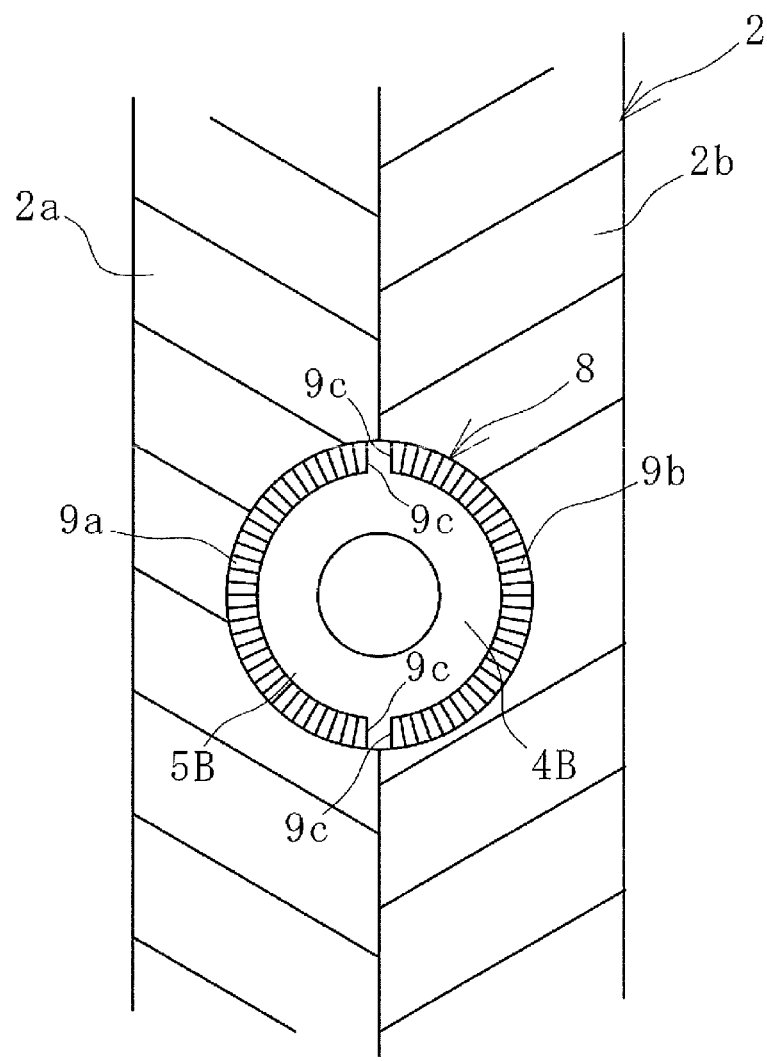
FIG. 7 is an explanatory diagram illustrating a state where a secondary resin is injected into the secondary cavity of FIG. 6.

Next, the molten secondary resin 5B is injected from the cylinder 1b into the mold 2. The injected secondary resin 5B is injected into the secondary cavity 4B through the sprue, the runner, and the gate that are formed in the mold 2. In this way, as illustrated in FIG. 7, the inner circumference side of each of the molded articles 9a, 9b is covered by the secondary resin 5B. The space 11 between the molded articles 9a, 9b is filled with the secondary resin 5B.

Figure 8:
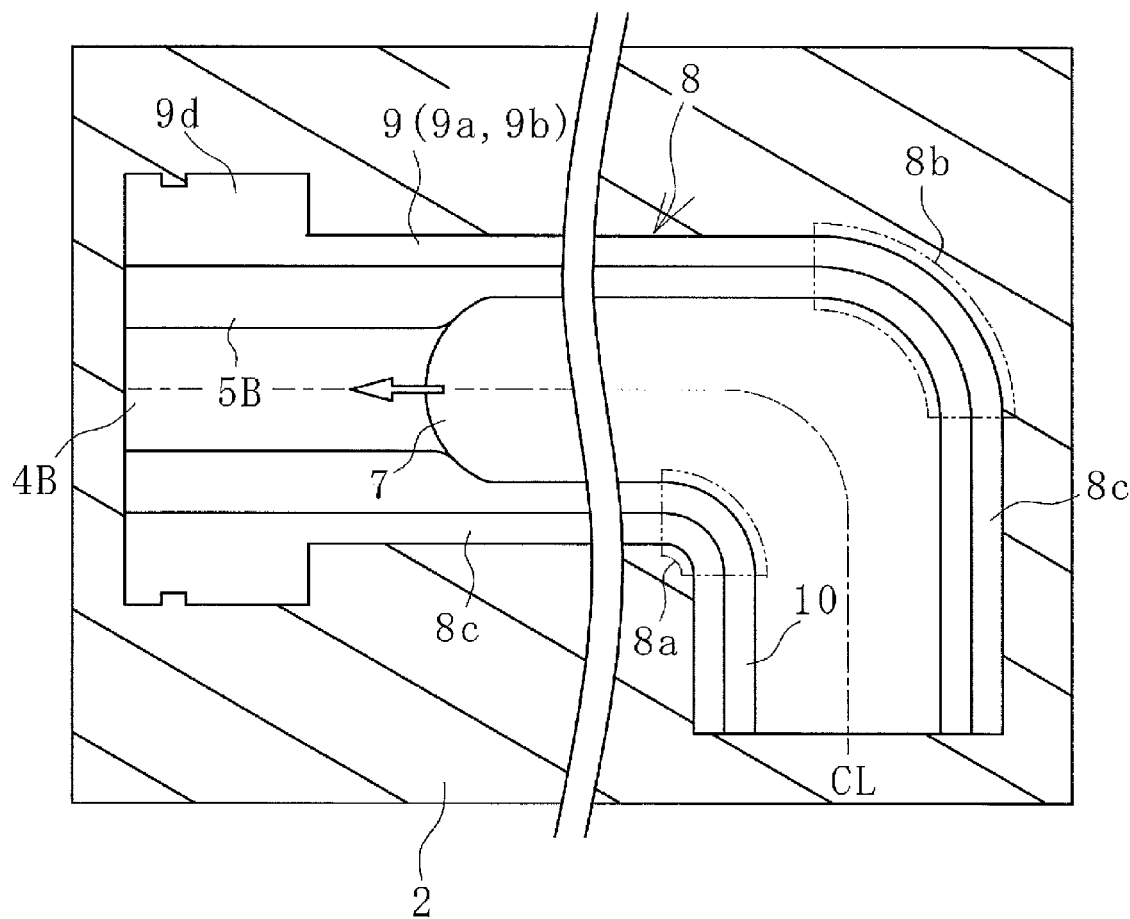
FIG. 8 is an explanatory diagram illustrating, in a longitudinal cross-sectional view, a state where an assist material is injected into the secondary cavity of FIG. 7 into which the secondary resin has been injected.

Next, the assist material 7 is injected at a predetermined high pressure from the assist material injection unit 1c into the mold 2. As illustrated in FIG. 8, the injected assist material 7 passes the inside of the secondary cavity 4B into which the molten secondary resin 5B is injected, at high pressure along the extension direction of the secondary cavity 4B. The assist material 7 passes, and thus an inner circumferential surface of the secondary resin 5B that has not yet completely cured is molded into a desired shape.

Thereafter, the injected secondary resin 5B is cured, and thus the inner surface layer 10 having a desired shape along the secondary cavity 4B is formed. In addition, the inner surface layer 10 and the two molded articles 9a, 9b are bonded together along with curing of the secondary resin 5B. In other words, the resin pipe 8 in which the inner surface layer 10 and the outer surface layer 9 are integrated is manufactured along with the completion of the injection molding process of the secondary resin 5B.

As described above, according to embodiments of the present invention, when the mold is formed in advance such that the primary cavities 4A are formed in a desired shape, the molded articles 9a, 9b having a desired outer shape can be molded during the primary molding. Then, by integrating the inner surface layer 10 formed of the secondary resin 5B cured during the secondary molding with the two molded articles 9a, 9b, a portion having any desired shape, such as the flange portion 9d can be more simply manufactured on the outer circumferential surface of the resin pipe 8 in a two-layer structure formed of the inner surface layer 10 and the outer surface layer 9. Since it is not necessary to retrofit members such as the flange portion 9d, manufacturing efficiency is advantageously improved.

In addition, according to embodiments of the present invention, when the resin pipe 8 is formed in a shape that can be formed by resin injection molding using the assist material 7, even the complicatedly bent resin pipe can be manufactured in large quantities. Note that when the primary resin 5A and the secondary resin 5B are made of the identical type of resin, it is advantageous for both to be more strongly integrated.

Figure 9:
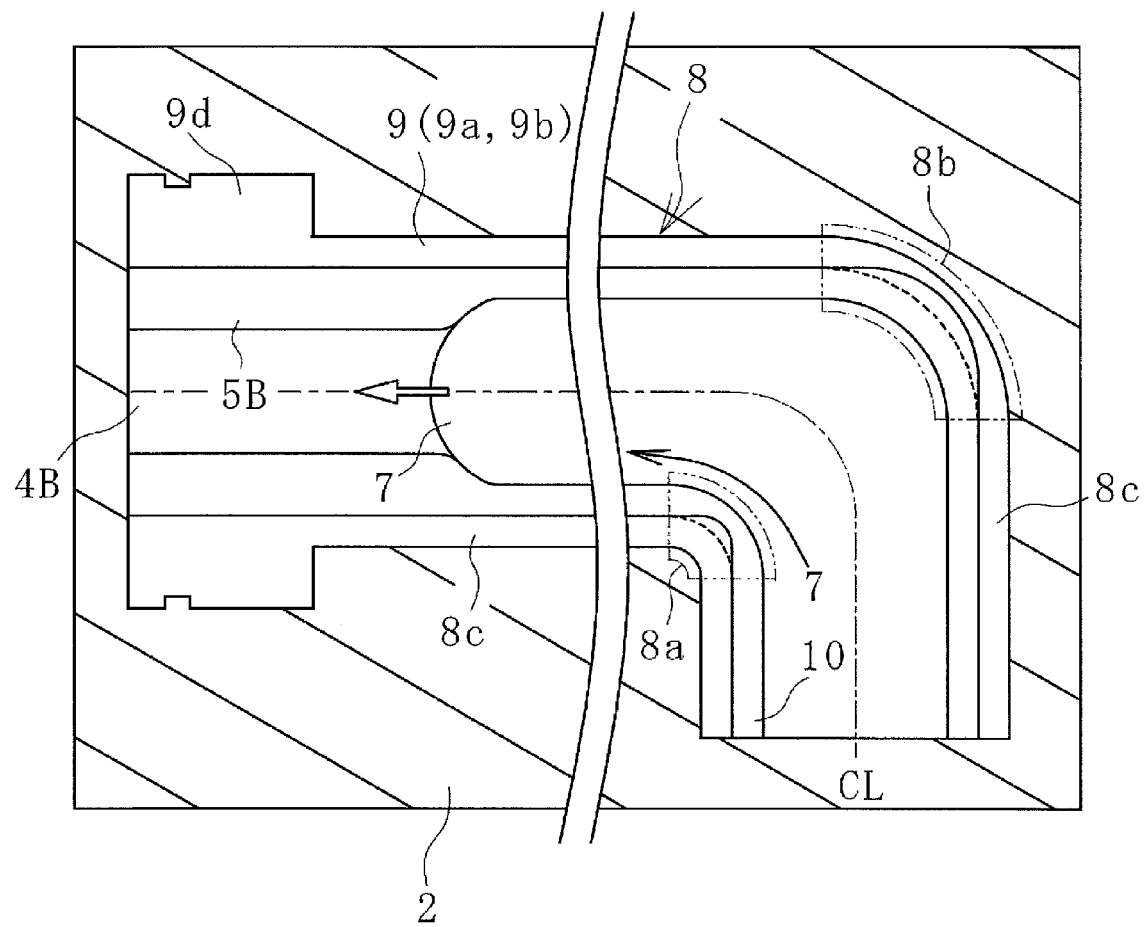
FIG. 9 is an explanatory diagram illustrating, in a longitudinal cross-sectional view, a modified example of a molded article internally fitted into the secondary cavity.

As illustrated in FIG. 9, when the resin pipe 8 is a bent pipe, the assist material 7 injected at high pressure during the secondary molding tends to pass in a biased manner toward an inner side of the bent portion that is the shortest route to the secondary cavity 4B. Consequently, the secondary resin 5B in the bent inner region 8a is cut more by the assist material 7 passing at high pressure. In this way, the wall thickness of the secondary resin 5B in the bent inner region 8a tends to be smaller than the wall thickness of the secondary resin 5B in the bent outer region 8b.

Accordingly, it is preferable that the wall thickness of the bent inner region 8a of the molded articles 9a, 9b is formed in advance larger than the wall thickness of the peripheral region. In FIG. 9, a case where the wall thickness of the bent inner region 8a is identical to the wall thickness of the peripheral region is indicated by dashed lines. More preferably, the wall thickness of the bent outer region 8b of the molded articles 9a, 9b is formed in advance smaller than the wall thickness of the peripheral region. In FIG. 9, a case where the wall thickness of the bent outer region 8b is identical to the wall thickness of the peripheral region is indicated by dashed lines. By adjusting in advance the wall thicknesses of the bent inner region 8a and the bent outer region 8b of the molded articles 9a, 9b as just described, the difference between the wall thicknesses of the bent inner region 8a and the bent outer region 8b of the manufactured resin pipe 8 is advantageously reduced. The wall thicknesses of the bent inner region 8a and the bent outer region 8b of the molded articles 9a, 9b, which are adjusted in advance can be set based on prior test molding, simulations, or the like.

Figure 10:
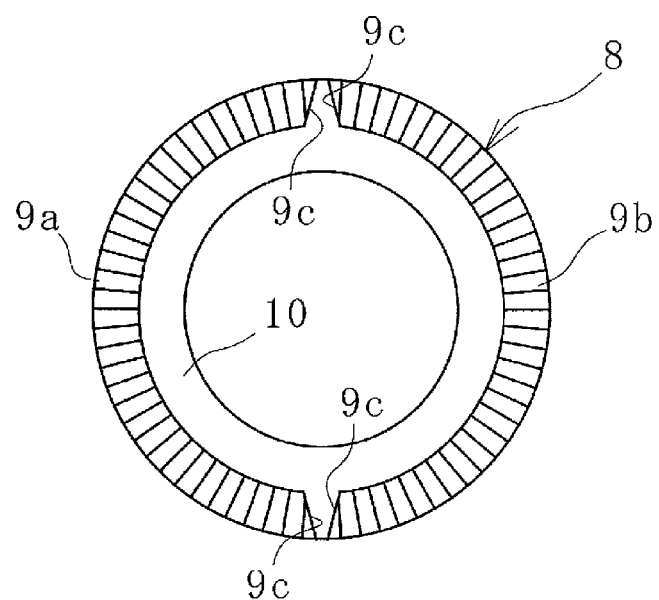
FIG. 10 is an explanatory diagram illustrating, in a cross-sectional view of the resin pipe, a modified example of a molded article.

As illustrated in FIG. 10, the opposed end portions 9c of the respective molded articles 9a, 9b can be set such that an interval between the opposed end portions is narrowed toward the outer circumference side. With this structure, the secondary resin 5B can be easily filled without a space between the opposed end portions 9c of the respective molded articles 9a, 9b. In addition, when internal pressure acts on the resin pipe 8, the inner surface layer 10 filled in a space between the opposed end portions 9c functions like a wedge, and the respective molded articles 9a, 9b are pressed in the circumferential direction. As a result, pressure resistance of the resin pipe 8 against the internal pressure is easily improved. In order to manufacture the resin pipe 8 having this structure, the space 11 between the two molded articles 9a, 9b internally fitted opposed to each other in a cylindrical shape into the secondary cavity 4B during the secondary molding may be set such that an interval is narrowed toward the outer circumference side in a cross-sectional view of the cylindrical shape.

Figure 11:
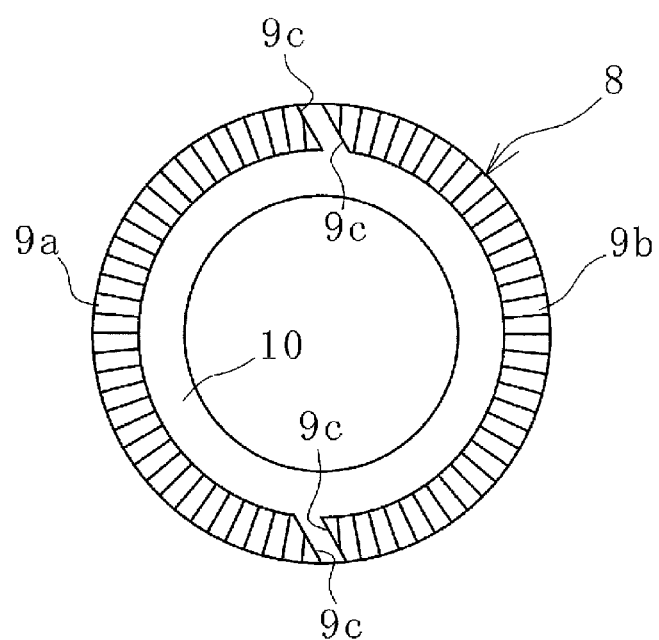
FIG. 11 is an explanatory diagram illustrating, in a cross-sectional view of the resin pipe, another modified example of a molded article.

As illustrated in FIG. 11, the opposed end portions 9c of the respective molded articles 9a, 9b can be inclined to one side in the circumferential direction. With this structure, a portion formed only of the inner surface layer 10 as viewed on the extension line in a radial direction can be reduced (eliminated). In other words, when internal pressure acts on the resin pipe 8, a portion in which the internal pressure is borne only by the inner surface layer 10 can be reduced (eliminated), and thus pressure resistance of the resin pipe 8 against the internal pressure is easily improved. In order to manufacture the resin pipe 8 having this structure, the space 11 between the two molded articles 9a, 9b internally fitted opposed to each other in a cylindrical shape into the secondary cavity 4B during the secondary molding may be inclined to one side in the circumferential direction in a cross-sectional view of the cylindrical shape.

Note that the structures of FIGS. 10 and 11 can be combined such that the interval between the opposed end portions 9c of the respective molded articles 9a, 9b are narrowed toward the outer circumference side and are also inclined to one side in the circumferential direction. In the case of this structure, the space 11 between the two molded articles 9a, 9b internally fitted opposed to each other in a cylindrical shape into the secondary cavity 4B during the secondary molding may be set such that an interval is narrowed toward the outer circumference side in a cross-sectional view of the cylindrical shape and may be inclined to one side in the circumferential direction in a cross-sectional view of the cylindrical shape.

REFERENCE SIGNS LIST

1 Forming device
1a, 1b Cylinder
1c Assist material injection unit
2 (2a, 2b) Mold
3a Recess portion
3b Protrusion portion
4A Primary cavity
4B Secondary cavity
5A Primary resin
5B Secondary resin
6 Reinforcing fiber
7 Assist material 8 Resin pipe
8a Bent inner region
8b Bent outer region
8c Straight-line region
9 Outer surface layer
9a, 9b Molded article
9c Opposed end portion
9d Flange portion
10 Inner surface layer
11 Space

The invention claimed is:

1. A method of manufacturing a resin pipe using a die slide injection mold configured such that positions at which molds to be assembled together during primary molding and secondary molding are slid, in which the resin pipe is manufactured by:

forming two molded articles in a cylindrical two-piece split shape by injecting a primary resin that is molten into two primary cavities that are formed by the molds assembled together during the primary molding;

internally fitting the two molded articles in a cylindrical shape into one secondary cavity formed by the molds assembled together during the secondary molding such that the molded articles are located opposed to each other via a space between the molded articles, injecting a secondary resin that is molten into the secondary cavity, and then injecting an assist material into the secondary cavity;

the assist material passes, and thus the inner circumferential surface of the secondary resin that has not yet completely cured is molded into the desired shape;

integrating an inner surface layer formed of the secondary resin, that has cured, with the two molded articles, wherein the molded articles having a desired outer shape are molded during the primary molding, and by integrating the inner surface layer formed of the secondary resin cured during the secondary molding with the two molded articles, a portion having any desired shape can be manufactured on an outer circumferential surface of the resin pipe in a two layer structure formed of the inner surface layer and the outer surface layer.

2. The method of manufacturing a resin pipe according to claim 1, wherein the resin pipe is a bent pipe, and a wall thickness of a region corresponding to an inner side of a bent portion of the two molded articles is formed larger than a wall thickness of a peripheral region.

3. The method of manufacturing a resin pipe according to claim 1, wherein reinforcing fibers are mixed only in the primary resin of the primary resin and the secondary resin that are molten.

4. The method of manufacturing a resin pipe according to claim 1, wherein a space between the two molded articles located opposed to each other and internally fitted in a cylindrical shape into the secondary cavity is set such that an interval is narrowed toward an outer circumference side in a cross-sectional view of the cylindrical shape.

5. The method of manufacturing a resin pipe according to claim 1, wherein a space between the two molded articles located opposed to each other and internally fitted in a cylindrical shape into the secondary cavity is inclined to one side in a circumferential direction in a cross-sectional view of the cylindrical shape.

6. The method of manufacturing a resin pipe according to claim 2, wherein reinforcing fibers are mixed only in the primary resin of the primary resin and the secondary resin that are molten.

7. The method of manufacturing a resin pipe according to claim 2, wherein a space between the two molded articles located opposed to each other and internally fitted in a cylindrical shape into the secondary cavity is set such that an interval is narrowed toward an outer circumference side in a cross-sectional view of the cylindrical shape.

8. The method of manufacturing a resin pipe according to claim 3, wherein a space between the two molded articles located opposed to each other and internally fitted in a cylindrical shape into the secondary cavity is set such that an interval is narrowed toward an outer circumference side in a cross-sectional view of the cylindrical shape.

9. The method of manufacturing a resin pipe according to claim 2, wherein a space between the two molded articles located opposed to each other and internally fitted in a cylindrical shape into the secondary cavity is inclined to one side in a circumferential direction in a cross-sectional view of the cylindrical shape.

10. The method of manufacturing a resin pipe according to claim 3, wherein a space between the two molded articles located opposed to each other and internally fitted in a cylindrical shape into the secondary cavity is inclined to one side in a circumferential direction in a cross-sectional view of the cylindrical shape.

11. The method of manufacturing a resin pipe according to claim 4, wherein a space between the two molded articles located opposed to each other and internally fitted in a cylindrical shape into the secondary cavity is inclined to one side in a circumferential direction in a cross-sectional view of the cylindrical shape.

12. The method of manufacturing a resin pipe according to claim 1, wherein a space between the two molded articles located opposed to each other and internally fitted in a cylindrical shape into the secondary cavity is narrowed toward the outer circumference of side in a cross-sectional view of cylindrical shape and is inclined to one side in a circumferential direction in a cross-sectional view of the cylindrical shape.

* * * * *